United States Patent
Neubacher et al.

(10) Patent No.: US 12,439,330 B2
(45) Date of Patent: Oct. 7, 2025

(54) METHOD FOR REALIZING CELL SELECTION BY A USER EQUIPMENT BEING IN A RADIO ENVIRONMENT COMPRISING A PLURALITY OF RADIO CELLS OF A PLURALITY OF MOBILE COMMUNICATION NETWORKS

(71) Applicant: Deutsche Telekom AG, Bonn (DE)

(72) Inventors: Andreas Neubacher, Korneuburg (AT); Kurt Bischinger, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/037,810

(22) PCT Filed: Nov. 2, 2021

(86) PCT No.: PCT/EP2021/080395
§ 371 (c)(1),
(2) Date: May 19, 2023

(87) PCT Pub. No.: WO2022/106191
PCT Pub. Date: May 27, 2022

(65) Prior Publication Data
US 2023/0422163 A1    Dec. 28, 2023

(30) Foreign Application Priority Data

Nov. 23, 2020    (EP) .................................... 20209264

(51) Int. Cl.
*H04W 48/20*    (2009.01)
*H04W 48/18*    (2009.01)
(52) U.S. Cl.
CPC ........... *H04W 48/20* (2013.01); *H04W 48/18* (2013.01)

(58) Field of Classification Search
CPC .............................. H04W 48/20; H04W 48/18
See application file for complete search history.

(56) References Cited

U.S. PATENT DOCUMENTS

| 9,155,036 B1* | 10/2015 | Singh ..................... H04W 48/20 |
| 2006/0264215 A1* | 11/2006 | Ekstedt ................. H04W 48/18 455/435.2 |

(Continued)

FOREIGN PATENT DOCUMENTS

| CN | 107787598 A | 3/2018 |
| JP | 2013258562 A | 12/2013 |
| WO | 2020000237 A1 | 1/2020 |

OTHER PUBLICATIONS

"3rd Generation Partnership Project; Technical Specification Group Radio Access Network; User Equipment (UE) procedures in idle mode and procedures for cell reselection in connected mode (Release 16)", 3GPP Draft; 25304-G00, 3rd Generation Partnership Project (3GPP), Mobile Competence Centre; 650, Route Des Lucioles ; F-06921 Sophia-Antipolis Cedex; France, Jul. 18, 2020 (Jul. 18, 2020), XP051909443, Retrieved from the Internet: URL:https://ftp.3gpp.org/3guinternal/3GPPultimate versions to be transposed/sentToDpc/25304~g00.zip 25304-900.doc [retrieved on Jul. 18, 2020].

*Primary Examiner* — Steven S Kelley
(74) *Attorney, Agent, or Firm* — LEYDIG, VOIT & MAYER, LTD.

(57) ABSTRACT

A method for realizing cell selection by a user equipment includes the following steps: in a first step, suitable radio cells of a considered radio access technology are determined by the user equipment based on a home public land mobile network (HPLMN)-provided cell selection criterion regarding the considered radio access technology; and in a second step, upon initiating network selection according to an automatic network selection mode, only such suitable radio (Continued)

cells are considered for network selection of the user equipment that have or correspond to reception conditions corresponding to or exceeding the HPLMN-provided cell selection criterion.

14 Claims, 1 Drawing Sheet

(56) References Cited

U.S. PATENT DOCUMENTS

| | | | |
|---|---|---|---|
| 2014/0036874 A1 | 2/2014 | Jeong et al. | |
| 2014/0295851 A1 | 10/2014 | Kubota et al. | |
| 2016/0150450 A1* | 5/2016 | Balasubramanian ... | H04W 8/08 |
| | | | 370/331 |
| 2016/0373995 A1 | 12/2016 | Kinthada et al. | |
| 2017/0094574 A1* | 3/2017 | Singh .................... | H04W 36/16 |
| 2018/0049087 A1 | 2/2018 | Lee et al. | |
| 2019/0159116 A1* | 5/2019 | Guan .................... | H04W 60/00 |
| 2020/0084741 A1 | 3/2020 | Chun et al. | |
| 2020/0128457 A1* | 4/2020 | Nader .................... | H04W 36/08 |
| 2021/0076317 A1* | 3/2021 | Kim ....................... | H04W 48/16 |
| 2023/0300739 A1* | 9/2023 | Nuggehalli ........... | H04W 48/16 |
| | | | 455/434 |
| 2024/0007939 A1* | 1/2024 | Neubacher ............ | H04W 48/20 |

* cited by examiner

METHOD FOR REALIZING CELL SELECTION BY A USER EQUIPMENT BEING IN A RADIO ENVIRONMENT COMPRISING A PLURALITY OF RADIO CELLS OF A PLURALITY OF MOBILE COMMUNICATION NETWORKS

CROSS-REFERENCE TO PRIOR APPLICATIONS

This application is a U.S. National Phase application under 35 U.S.C. § 371 of International Application No. PCT/EP2021/080395, filed on Nov. 2, 2021, and claims benefit to European Patent Application No. EP 20209264.9, filed on Nov. 23, 2020. The International Application was published in English on May 27, 2022 as WO 2022/106191 A1 under PCT Article 21(2).

FIELD

The present invention relates to a method for realizing cell selection by a user equipment being in a radio environment comprising a plurality of radio cells of a plurality of mobile communication networks, each one of these radio cells being associated, respectively, to at least one mobile communication network of the plurality of mobile communication networks, wherein the user equipment measures or detects reception conditions regarding the plurality of radio cells, and subsequently selects and/or registers to a mobile communication network out of the plurality of mobile communication networks.

Furthermore, the present invention relates to a user equipment for realizing cell selection within a radio environment comprising a plurality of radio cells of a plurality of mobile communication networks, each one of these radio cells being associated, respectively, to at least one mobile communication network of the plurality of mobile communication networks, wherein the user equipment is configured to measure or to detect reception conditions regarding the plurality of radio cells, and is configured to subsequently select and/or register to a mobile communication network out of the plurality of mobile communication networks.

Additionally, the present invention relates to a system or a mobile communication network for realizing cell selection by a user equipment being in a radio environment comprising a plurality of radio cells of a plurality of mobile communication networks, each one of these radio cells being associated, respectively, to at least one mobile communication network of the plurality of mobile communication networks, wherein the user equipment is configured to measure or to detect reception conditions regarding the plurality of radio cells, and is configured to subsequently select and/or register to a mobile communication network out of the plurality of mobile communication networks.

Furthermore, the present invention relates to a program and to a computer-readable medium for realizing cell selection by a user equipment being in a radio environment comprising a plurality of radio cells of a plurality of mobile communication networks according to a method according to the invention.

BACKGROUND

In currently deployed mobile communication networks, a user equipment or mobile station typically experiences a radio environment (i.e. the different radio frequency signals that the user equipment—at its current position or location—is potentially able to receive on different frequencies and/or frequency bands and/or at different points in time or time intervals or time slots) comprising a plurality of radio cells that are at least detectable and/or receivable by the respective user equipment or mobile station. One such radio cell is typically provided by a base station entity, i.e. an antenna arrangement of a specific base station entity emits radio frequency signals such that the user equipment, at its current position or location, is able to receive such radio frequency signals with a sufficient quality, typically with a sufficient signal to noise ratio. If this is the case, the radio environment of the user equipment comprises the considered radio cell. A plurality of radio cells (i.e. of base station entities) are typically part of a mobile communication network being a cellular mobile communication network. Hence, the plurality of radio cells of the radio environment of the user equipment are typically part of a plurality of mobile communication networks, typically each one of these radio cells being associated, respectively, to either one mobile communication network of the plurality of mobile communication networks or to more than one mobile communication networks of the plurality of mobile communication networks. Hence, via selecting a radio cell (out of the plurality of radio cells present or receivable of the radio environment at the considered position or location of the user equipment), the user equipment also selects a mobile communication network (that is associated to that radio cell). However, before a mobile communication network is considered as a network selection candidate (i.e. a candidate mobile communication network) at all, the user equipment needs to find a suitable radio cell of a mobile communication network or public land mobile network to camp on. The criteria for a radio cell to be considered as suitable radio cell (to camp on), is dependent on the considered network technology (or radio access technology) being defined in or via the relevant standardization documents, mostly referred to 3GPP (third generation partnership project) documents.

In presently known mobile communication networks, i.e. in networks in compliance with the currently defined standards or standard documents, a number of drawbacks might occur: In bad or unfavorable radio coverage conditions (of a user equipment), the 3GPP defined order or prioritization of how mobile communication networks are being selected to obtain communication services or any service is not suitable in all relevant situations. For example, in some situations the field strength or quality (of the radio signal or a plurality of radio signals) of a radio cell (of the user equipment's radio environment) is not considered in the network selection process (PLMN selection process), leading to user equipments not being able to receive and/or transmit data subsequent to the initial network selection process (PLMN selection process). Such situations include cases where some user equipments may fail obtaining data services, even though the selected public land mobile network fulfilled the cell selection criteria for considering the respective mobile communication network (public land mobile network) in the network selection (or PLMN selection) process. In particular, in case that a user equipment is in or at an unfavorable position, the applicable cell selection criteria (e.g. "RX Access Lev min" criteria) might be barely fulfilled, conducting the user equipment to consider the respective public land mobile network for PLMN selection, but in fact due to, e.g., fading or local interference at the location of the user equipment, data transport between the network and the user equipment may fail subsequently. Such cases occur, especially regarding cellular user equipments or devices for internet-of-things or M2M (Machine to Machine) communications services, which devices are often used in a stationary manner (e.g. meters or all kinds of sensors or the like) and in case of unfavorable radio (reception) conditions, this kind of problem is likely to subsist permanently for such user equipments, leading to the situation of such a user equipment (especially if in automatic network selection mode) being stuck on a PLMN, while not being able to transmit data. In absence of an advanced application logic, such user equipments may currently need manual interventions on site since they are likewise not reachable anymore; hence such user equipments might need to be switched or reconfigured to manual network selection (PLMN Selection) mode, and an appropriate mobile communication network might need to be selected permanently, potentially leading to further difficulties in selecting the appropriate mobile communication network in case of network modifications and/or local modification of the respective base station entities involved. Such interventions might be costly for users of such user equipments (especially internet-of-things devices but not necessarily), and due to the use of manual network selection mode, the advantages of an automatic network selection, e.g. re-selection to another mobile communication network in case of an outage of the registered network (registered public land mobile network, RPLMN), are not possible to realize anymore.

SUMMARY

In an exemplary embodiment, the present invention provides a method for realizing cell selection by a user equipment in a radio environment comprising a plurality of radio cells of a plurality of mobile communication networks, each one of these radio cells being associated, respectively, to at least one mobile communication network of the plurality of mobile communication networks. The user equipment measures or detects reception conditions regarding the plurality of radio cells, and subsequently selects and/or registers to a mobile communication network out of the plurality of mobile communication networks. The user equipment has or is associated with a home public land mobile network (HPLMN), wherein regarding cell selection by the user equipment a HPLMN-provided cell selection criterion is defined, wherein a radio cell of a respective considered radio access technology is considered to be a suitable radio cell only in case that corresponding reception conditions, as measured by the user equipment, correspond to or exceed the HPLMN-provided cell selection criterion regarding the respective considered radio access technology. The method comprises the following steps: in a first step, suitable radio cells of a considered radio access technology are determined by the user equipment based on the HPLMN-provided cell selection criterion regarding the considered radio access technology; and in a second step, upon initiating network selection according to an automatic network selection mode, only such suitable radio cells are considered for network selection of the user equipment that have or correspond to reception conditions corresponding to or exceeding the HPLMN-provided cell selection criterion.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the present invention provide a technically simple, effective and cost effective solution for an enhanced cell selection by a user equipment being in a radio environment comprising a plurality of radio cells of a plurality of mobile communication networks. Exemplary embodiments of the present invention further provide a corresponding user equipment, system or mobile communication network, and a corresponding program and computer-readable medium.

In an exemplary embodiment, the present invention provides a method for realizing cell selection by a user equipment being in a radio environment comprising a plurality of radio cells of a plurality of mobile communication networks, each one of these radio cells being associated, respectively, to at least one mobile communication network of the plurality of mobile communication networks, wherein the user equipment measures or detects reception conditions regarding the plurality of radio cells, and subsequently selects and/or registers to a mobile communication network out of the plurality of mobile communication networks, wherein the user equipment has or is associated with a home public land mobile network (HPLMN), wherein regarding cell selection by the user equipment HPLMN-provided cell selection criterion is defined, wherein a radio cell of a considered radio access technology is considered to be a suitable radio cell only in case that the corresponding reception conditions, as measured by the user equipment, correspond to or exceed the additional HPLMN provided offset to the conventional cell selection criterion regarding the considered radio access technology, wherein the method comprises the following steps:
  in a first step, suitable radio cells of a considered radio access technology are determined by the user equipment based on the HPLMN-provided cell selection criterion regarding the considered radio access technology,
  in a second step, upon initiating network selection according to the automatic network selection mode, only such suitable radio cells are considered for network selection of the user equipment that have or correspond to reception conditions corresponding to or exceeding the HPLMN-provided cell selection criterion.

It is thereby advantageously possible according to the present invention that—by applying the HPLMN-provided cell selection criterion instead of the conventionally used cell selection criterion—network selection is able to be performed in an optimized manner, especially leading to avoid problems related to the use of the conventional cell selection criterion such as the ones mentioned above.

The conventionally used criteria for a radio cell to be considered as a suitable radio cell (i.e. for a user equipment to camp on), is dependent on the considered network technology (or radio access technology) used, i.e. the radio access technology that both the user equipment and the radio cell are using. Typically, different generations of mobile communication systems (i.e. different radio access technologies) are considered, most often including one, all or a subset of the following: 2G, 3G, 4G and 5G technology (i.e. second generation mobile communication systems (GSM, global system for mobile communications), third generation mobile communication systems (UMTS, Universal Mobile Telecommunications System including its radio technology E-UTRA; evolved UMTS Terrestrial Radio Access), fourth generation mobile communication systems (LTE, long term evolution including its radio technology E-UTRA, evolved UMTS Terrestrial Radio Access), and fifth generation mobile communication systems (5GS, 5G system including its radio technology NR, New Radio)), but further or additional or alternative radio access technologies are not excluded according to the present invention.

In the following, the conventionally used cell selection criteria (or cell selection criterion) are (is) provided according to the different, currently most often deployed radio access technologies:

GSM Network: For a GSM network, the criterion among others to access or camp on a radio cell is given in 3GPP TS 43.022 "Functions related to Mobile Station (MS) in idle mode and group receive mode", especially version V16.0.0 (2020-07), Section 3.6;

The parameter RXLEV_ACCESS_MIN, which is broadcast as system information, and is related to the minimum signal that the operator wants the network to receive when being initially accessed by an MS.

UTRA Network: For a UTRA Network, the criteria among others to access or camp on a cell are given in 3GPP TS 25.304 "User Equipment (UE) procedures in idle mode and procedures for cell reselection in connected mode", especially version V16.0.0 (2020-07), Section 5.2.3.1.2; the cell selection criterion S is fulfilled when, for FDD cells, Srxlev>0 and Squal>0, and, for TDD cells, Srxlev>0, where $Squal=Q_{qualmeas}-(Qqualmin+QqualminOffset)-Qoffset_{temp}$, and $Srxlev=Q_{rxlevmeas}-(Qrxlevmin+QrxlevminOffset)-Pcompensation-Qoffset_{temp}$, where the signalled values QqualminOffset and QrxlevminOffset are only applied when a cell is evaluated for cell selection as a result of a periodic search for a higher priority PLMN while camped normally in a VPLMN (visited public land mobile network), and where: Squal corresponds to the Cell Selection quality value (dB), applicable only for FDD cells; Srxlev corresponds to the Cell Selection RX level value (dB);

Qoffsettemp corresponds to the Offset temporarily applied to a cell (dB);

Qqualmeas corresponds to the Measured cell quality value; the quality of the received signal expressed in CPICH $E_c/N_0$ (dB) for FDD cells. CPICH $E_c/N_0$ shall be averaged; applicable only for FDD cells;

Qrxlevmeas corresponds to the Measured cell RX level value; this is received signal, CPICH RSCP for FDD cells (dBm) and P-CCPCH RSCP for TDD cells (dBm);

Qqualmin corresponds to the Minimum required quality level in the cell (dB); applicable only for FDD cells;

QqualminOffset corresponds to the Offset to the signalled Qqualmin taken into account in the Squal evaluation as a result of a periodic search for a higher priority PLMN while camped normally in a VPLMN;

Qrxlevmin corresponds to the Minimum required RX level in the cell (dBm);

QrxlevminOffset corresponds to the Offset to the signalled Qrxlevmin taken into account in the Srxlev evaluation as a result of a periodic search for a higher priority PLMN while camped normally in a VPLMN;

Pcompensation corresponds to max(UE_TXPWR_MAX_RACH-P_MAX, 0) (dB) UE_TXPWR_MAX_RACH corresponds to the Maximum TX power level an UE may use when accessing the cell on RACH (read in system information) (dBm);

P_MAX corresponds to the Maximum RF output power of the UE (dBm).

LTE and NB-IoT Networks/E-UTRA Networks: For LTE and NB-IoT Networks the criteria among others to access or camp on a cell are given in 3GPP TS 36.304 "User Equipment (UE) procedures in idle mode", especially version V16.1.0 (2020-07), Section 5.2.3.2 and 5.2.3.2a:

Cell Selection Criterion for LTE: The cell selection criterion S in normal coverage is fulfilled when: Srxlev>0 AND Squal>0 where:

$Srxlev=Qrxlevmeas-(Qrxlevmin+Qrxlevminoffset)-Pcompensation-Qoffsettemp$ $Squal=Qqualmeas-(Qqualmin+Qqualminoffset)-Qoffsettemp$ where:

Srxlev corresponds to the Cell selection RX level value (dB);

Squal corresponds to the Cell selection quality value (dB);

Qoffsettemp corresponds to the Offset temporarily applied to a cell (dB);

Qrxlevmeas corresponds to the Measured cell RX level value (RSRP);

Qqualmeas corresponds to the Measured cell quality value (RSRQ);

Qrxlevmin corresponds to the Minimum required RX level in the cell (dBm);

Qqualmin corresponds to the Minimum required quality level in the cell (dB);

Qrxlevminoffset corresponds to the Offset to the signalled Qrxlevmin taken into account in the Srxlev evaluation as a result of a periodic search for a higher priority PLMN while camped normally in a VPLMN;

Qqualminoffset corresponds to the Offset to the signalled Qqualmin taken into account in the Squal evaluation as a result of a periodic search for a higher priority PLMN while camped normally in a VPLMN;

Pcompensation corresponds to: If the UE supports the additional Pmax in the NS-PmaxList, if present, in SIB1, SIB3 and SIB5:

max(*PE* MAX 1-PPowerClass,0)-(min(*PE* MAX 2,PPowerClass)-min(*PE* MAX 1, PPowerClass)) (dB), else:

if PPowerClass is 14 dBm:max(*PE* MAX1-(PPowerClass-Poffset),0) (dB), else: max(*PE* MAX 1-PPowerClass,0) (dB);

PEMAX1, PEMAX2 corresponds to the Maximum TX power level a UE may use when transmitting on the uplink in the cell (dBm) defined as PEMAX; PEMAX1 and PEMAX2 are obtained from the p-Max and the NS-PmaxList respectively in SIB1, SIB3 and SIB5 as specified in TS 36.331;

PPowerClass corresponds to the Maximum RF output power of the UE (dBm) according to the UE power class as defined in TS 36.101.

The signalled values Qrxlevminoffset and Qqualminoffset are only applied when a cell is evaluated for cell selection as a result of a periodic search for a higher priority PLMN while camped normally in a VPLMN, as specified in TS 23.122.

If cell selection criterion S in normal coverage is not fulfilled for a cell, UE shall consider itself to be in enhanced coverage if the cell selection criterion S for enhanced coverage is fulfilled, where:

Qrxlevmin UE applies coverage specific value Qrxlevmin_CE (dBm)

Qqualmin UE applies coverage specific value Qqualmin_CE (dB)

If cell selection criteria S in normal coverage is fulfilled for a cell, UE may consider itself to be in enhanced coverage if SystemInformationBlockType1 cannot be acquired but UE is able to acquire Masterinformation-Block, SystemInformationBlockType1-BR and SystemInformationBlockType2.

If cell selection criterion S in normal coverage is not fulfilled for a cell and UE does not consider itself in enhanced coverage based on coverage specific values Qrxlevmin_CE and Qqualmin_CE, UE shall consider itself to be in enhanced coverage if UE supports CE Mode B and CE mode B is not restricted by upper layers and the cell selection criterion S for enhanced coverage is fulfilled, where:

Qrxlevmin UE applies coverage specific value Qrxlevmin_CE1 (dBm)

Qqualmin UE applies coverage specific value Qqualmin_CE1 (dB).

For the UE in enhanced coverage, coverage specific values Qrxlevmin_CE and Qqualmin_CE (or Qrxlevmin_CE1 and Qqualmin_CE1) are only applied for the suitability check in enhanced coverage (i.e. not used for measurement and reselection thresholds).

Cell Selection Criterion for NB-IoT: If the measurements are performed on the non-anchor carrier and UE meets the requirements specified in TS 36.133 the cell selection criterion S is fulfilled when: Srxlev>0, else, the cell selection criterion S is fulfilled when: Srxlev>0 AND Squal>0, where:

$$Srxlev=Qrxlevmeas-Qrxlevmin-Pcompensation-Qoffsettemp$$

$$Squal=Qqualmeas-Qqualmin-Qoffsettemp$$

where:

Srxlev corresponds to the Cell selection RX level value (dB);

Squal corresponds to the Cell selection quality value (dB);

Qoffsettemp corresponds to the Offset temporarily applied to a cell as specified in TS 36.331 (dB);

Qrxlevmeas corresponds to the Measured cell RX level value (RSRP), if RSRP is measured on non-anchor carrier of the cell, the measured RSRP value is translated to Qrxlevmeas as:

$$Qrxlevmeas=QrxlevmeasNonAnchor-nrs\text{-}PowerOffsetNonAnchor, where$$

QrxlevmeasNonAnchor is the Measured RX level (RSRP) of the non-anchor carrier;

Qqualmeas corresponds to the Measured cell quality value (RSRQ);

Qrxlevmin corresponds to the Minimum required RX level in the cell (dBm), if UE is not authorized for enhanced coverage and Qoffsetauthorization is valid then Qrxlevmin=Qrxlevmin+Qoffsetauthorization;

Qqualmin corresponds to the Minimum required quality level in the cell (dB);

Pcompensation corresponds to: If the UE supports the additionalPmax in the NS-PmaxList-NB, if present, in SIB1-NB, SIB3-NB and SIB5-NB:

$$\max(PE\ MAX\ 1-PPowerClass,0)-(\min(PE\ MAX\ 2,PPowerClass)-\min(PE\ MAX\ 1,PPowerClass))$$

(dB), else: if PPowerClass is 14 dBm:

$$\max(PE\ MAX\ 1-(PPowerClass-Poffset),0)\ (dB),$$
$$\text{else:}\max(PE\ MAX\ 1-PPowerClass,0)\ (dB);$$

PEMAX1, PEMAX2 corresponds to the Maximum TX power level an UE may use when transmitting on the uplink in the cell (dBm) defined as PEMAX in TS 36.101. PEMAX1 and PEMAX2 are obtained from the p-Max and the NS-PmaxList-NB respectively in SIB1-NB, SIB3-NB and SIB5-NB as specified in TS 36.331;

PPowerClass corresponds to the Maximum RF output power of the UE (dBm) according to the UE power class as defined in TS 36.101.

NR Network: For a NR Network the criteria among others to access or camp on a cell is given in 3GPP TS 38.304 "User Equipment (UE) procedures in Idle mode and RRC Inactive state", especially version V16.1.0 (2020-07), Section 5.2.3.2; the cell selection criterion S is fulfilled when: Srxlev>0 AND Squal>0 where:

$$Srxlev=Qrxlevmeas-(Qrxlevmin+Qrxlevminoffset)-Pcompensation-Qoffsettemp$$

$$Squal=Qqualmeas-(Qqualmin+Qqualminoffset)-Qoffsettemp, where:$$

Srxlev corresponds to the Cell selection RX level value (dB);

Squal corresponds to the Cell selection quality value (dB);

Qoffsettemp corresponds to the Offset temporarily applied to a cell as specified in TS 38.331 (dB);

Qrxlevmeas corresponds to the Measured cell RX level value (RSRP);

Qqualmeas corresponds to the Measured cell quality value (RSRQ);

Qrxlevmin corresponds to the Minimum required RX level in the cell (dBm); if the UE supports SUL frequency for this cell, Qrxlevmin is obtained from q-RxLevMinSUL, if present, in SIB1, SIB2 and SIB4, additionally, if QrxlevminoffsetcellSUL is present in SIB3 and SIB4 for the concerned cell, this cell specific offset is added to the corresponding Qrxlevmin to achieve the required minimum RX level in the concerned cell, else Qrxlevmin is obtained from q-RxLevMin in SIB1, SIB2 and SIB4, additionally, if Qrxlevminoffsetcell is present in SIB3 and SIB4 for the concerned cell, this cell specific offset is added to the corresponding Qrxlevmin to achieve the required minimum RX level in the concerned cell. Qqualmin corresponds to the Minimum required quality level in the cell (dB); additionally, if Qqualminoffsetcell is signalled for the concerned cell, this cell specific offset is added to achieve the required minimum quality level in the concerned cell;

Qrxlevminoffset corresponds to the Offset to the signalled Qrxlevmin taken into account in the Srxlev evaluation as a result of a periodic search for a higher priority PLMN while camped normally in a VPLMN, as specified in TS 23.122;

Qqualminoffset corresponds to the Offset to the signalled Qqualmin taken into account in the Squal evaluation as a result of a periodic search for a higher priority PLMN while camped normally in a VPLMN, as specified in TS 23.122;

Pcompensation corresponds to: For FR1, if the UE supports the additionalPmax in the NR-NS-PmaxList, if present, in SIB1, SIB2 and SIB4:

max($PE$ MAX 1–PPowerClass,0)–(min($PE$ MAX 2,PPowerClass)–min($PE$ MAX 1,PPowerClass)) (dB), else: max($PE$ MAX 1–PPowerClass,0) (dB); For $FR2$,Pcompensation is set to 0;

PEMAX1, PEMAX2 corresponds to: Maximum TX power level of a UE may use when transmitting on the uplink in the cell (dBm) defined as PEMAX in TS 38.101; if UE supports SUL frequency for this cell, PEMAX1 and PEMAX2 are obtained from the p-Max for SUL in SIB1 and NR-NS-PmaxList for SUL respectively in SIB1, SIB2 and SIB4 as specified in TS 38.331, else PEMAX1 and PEMAX2 are obtained from the p-Max and NR-NS-PmaxList respectively in SIB1, SIB2 and SIB4 for normal UL as specified in TS 38.331; PPowerClass corresponds to the Maximum RF output power of the UE (dBm) according to the UE power class as defined in TS 38.101-1;

The signalled values Qrxlevminoffset and Qqualminoffset are only applied when a cell is evaluated for cell selection as a result of a periodic search for a higher priority PLMN while camped normally in a VPLMN (TS 23.122).

Once the user equipment (or, more specifically, the so-called AS, Access Stratum part of the user equipment) has read one or several PLMNs, i.e. one or several radio cells, which may belong to different mobile communication networks or public land mobile networks, the radio cells or public land mobile networks that passed the cell selection criterion (to be, respectively, applied in view of the potentially different radio access technologies) are reported to the so-called NAS, Non Access Stratum, (or NAS part of the user equipment) for the subsequent stage (or step) of network selection. Typically, this reporting includes also the transmission of the respective field strength values (measured by the user equipment) such as, e.g., the RSRP (Reference Signals Received Power) value. Typically according to the conventionally known and used standardized user equipment behavior, respective field strength values (as measured by the user equipment) are not reported to the NAS regarding such radio cells that not only fulfill the cell selection criterion (to be applied, respectively, regarding the considered radio access technology) but that also fulfill a so-called high quality criterion; however, also regarding such high quality radio cells, the AS indicates their high quality property (or the fact these radio cells have been measured to fulfill the high quality criterion) to the NAS, and hence, at least implicitly, also transmits a field strength value regarding these radio cells.

In the following, the conventionally used high quality criteria (or high quality criterion) are (is) provided according to the different, currently most often deployed radio access technologies:

GSM: For GSM the High Quality Criterion is given in 3GPP TS 43.022 "Functions related to Mobile Station (MS) in idle mode and group receive mode", especially version V16.0.0 (2020-07), Section 4.4.3 to be as follows: A PLMN shall be understood to be received with high quality signal if the signal level is above −85 dBm.

UTRAN: For UTRA the High Quality Criterion is given in 3GPP TS 25.304 "User Equipment (UE) procedures in idle mode and procedures for cell reselection in connected mode", especially version V16.0.0 (2020-07), Section 5.1.2.2 to be as follows: For an FDD cell, the measured primary CPICH RSCP value shall be greater than or equal to −95 dBm; for a TDD cell, the measured P-CCPCH RSCP shall be greater than or equal to −84 dBm.

E-UTRAN: For LTE/NB-IoT the High Quality Criterion is given in 3GPP TS 36.304 "User Equipment (UE) procedures in idle mode", especially version V16.1.0 (2020-07), Section 5.1.2.2 to be as follows: For an E-UTRAN and NB-IoT cell, the measured RSRP value shall be greater than or equal to −110 dBm.

NR: For NR the High Quality Criterion is given in 3GPP TS 38.304 "User Equipment (UE) procedures in Idle mode and RRC Inactive state", especially version V16.1.0 (2020-07), Section 5.1.1.2 to be as follows: For an NR cell, the measured RSRP value shall be greater than or equal to −110 dBm.

Based on the reporting (especially by the AS part of the user equipment to the NAS part of the user equipment), the actual network selection takes place. In a simplified manner, it can be said that, at switch on or recovery from lack of coverage, either the last registered PLMN or an equivalent PLMN (to the last registered PLMN) or as an option configured on the SIM, subscriber identity module of the user equipment, either the HPLMN (home public land mobile network) or the highest priority EHPLMN (equivalent home public land mobile network) that is available is selected. Regarding re-selection, the simplified order for network selection is as follows:

i) either the HPLMN or the highest priority EHPLMN that is available,
ii) each PLMN/access technology combination in the "User Controlled PLMN Selector with Access Technology" data file in the SIM (in priority order),
iii) each PLMN/access technology combination in the "Operator Controlled PLMN Selector with Access Technology" data file in the SIM (in priority order) or stored in the user equipment (in priority order),
iv) other PLMN/access technology combinations with received "high quality" signal in random order,
v) other PLMN/access technology combinations in order of decreasing signal quality.

In greater detail, the selection of a (mobile communication) network (among the radio cells reported to be receivable, by the user equipment, with sufficient signal strength) in Automatic Network Selection Mode, is defined depending on the actual condition of the user equipment, especially whether the user equipment has been switched on or recovers from lack of coverage, or whether a re-selection has been triggered by the user (of the user equipment), which is provided as follows:

At switch on or recovery from lack of coverage, the user equipment or mobile station selects the registered PLMN (RPLMN) or equivalent PLMN, i.e. the ERPLMN. As an alternative option to this, if the user equipment or mobile station is in automatic network selection mode and it finds coverage of an EHPLMN (HPLMN or an equivalent PLMN to the HPLMN), the user equipment or mobile station may register to that EHPLMN and not return to the registered PLMN or equivalent PLMN. The operator (of the HPLMN of the user equipment) shall be able to control by SIM configuration whether a user equipment or mobile station that supports this option is permitted to perform this alternative behavior. If the above network selection attempt is not successful, the user equipment or mobile station selects and attempts registration on other PLMN/access technology combinations, if available and allowable, in the following order:

i) either the HPLMN (if the EHPLMN list is not present or is empty) or the highest priority EHPLMN that is available (if the EHPLMN list is present);
ii) each PLMN/access technology combination in the "User Controlled PLMN Selector with Access Technology" data file in the SIM (in priority order);
iii) each PLMN/access technology combination in the "Operator Controlled PLMN Selector with Access Technology" data file in the SIM (in priority order) or stored in the ME (in priority order);
iv) other PLMN/access technology combinations with received high quality signal in random order;
v) other PLMN/access technology combinations in order of decreasing signal quality.

Reselection triggered by the User: At any time the user may request the user equipment or mobile station to initiate reselection and registration onto an available PLMN, according to the following procedure. In case of Automatic Network Selection Mode, the MS selects and attempts registration on PLMN/access technology combinations, if available and allowable, in all of its bands of operation in accordance with the following order:

i) the HPLMN (if the EHPLMN list is not present or is empty) or the highest priority EHPLMN that is available (if the EHPLMN list is present);
ii) PLMN/access technology combinations contained in the "User Controlled PLMN Selector with Access Technology" data file in the SIM (in priority order) excluding the previously selected PLMN/access technology combination;
iii) PLMN/access technology combinations contained in the "Operator Controlled PLMN Selector with Access Technology" data file in the SIM (in priority order) or stored in the user equipment (in priority order) excluding the previously selected PLMN/access technology combination;
iv) other PLMN/access technology combinations with the received high quality signal in random order excluding the previously selected PLMN/access technology combination;
v) other PLMN/access technology combinations, excluding the previously selected PLMN/access technology combination in order of decreasing signal quality or, alternatively, the previously selected PLMN/access technology combination may be chosen ignoring its signal quality;
vi) The previously selected PLMN/access technology combination.

In case the user equipment is in a VPLMN (visited public land mobile network), the user equipment or mobile station shall periodically attempt to obtain service on its HPLMN (if the EHPLMN list is not present or is empty) or one of its EHPLMNs (if the EHPLMN list is present) or a higher priority PLMN/access technology combinations listed in "user controlled PLMN selector" or "operator controlled PLMN selector" by scanning in accordance with the requirements that are applicable to i), ii) and iii) as defined above regarding the situation of "at switch on or recovery from lack of coverage".

In the case that the user equipment or mobile station has a stored "Equivalent PLMNs" list, the user equipment shall only select a PLMN if it is of a higher priority than those of the same country as the current serving PLMN which are stored in the "Equivalent PLMNs" list.

Hence, in conventional mobile communication networks the commonly applied or conducted (mobile communication) network selection behavior as defined in the 3GPP standardization documents has the drawback of mobile communication networks being selected (in the network selection stage) only based on "non-field-strength or quality-based" criteria, once a radio cell (or corresponding public land mobile network) has passed the cell selection criterion (or criteria) as indicated above. This is typically the root cause for the above mentioned problems and drawbacks of the currently applied steps of both cell selection and network selection (especially at switch on or recovery from lack of coverage), i.e. a considered user equipment is just able to register (to a radio cell due to the applicable cell selection criterion being fulfilled), but subsequently fails in actually transmitting data, since such a user equipment might be in comparatively bad or unfavorable coverage conditions, e.g. experiencing fading or local interference at the user equipment location. Hence, despite the fact that other (mobile communication) networks with better conditions (or being able to provide an enhanced quality-of-service) would be available, such a user equipment remains stuck with the selected mobile communication network by applying the above mentioned conventionally known procedure.

According to the present invention, regarding cell selection, by the user equipment, a HPLMN-provided cell selection criterion—or new cell selection criterion—is defined and used by the user equipment (or mobile station). This means according to the present invention that a radio cell of a considered radio access technology is considered to be a suitable radio cell only in case that the corresponding reception conditions, as measured by the user equipment, correspond to or exceed the HPLMN-provided cell selection criterion regarding the considered radio access technology, i.e. the definition of what is considered to be suitable radio cell differs, according to the present invention, from the definition as applied or defined in conventionally known mobile communication networks. Usually, the HPLMN-provided cell selection criterion according to the present invention (i.e. the modification proposed to apply to the currently known and used cell selection criterion) will have the effect—via requiring, by the HPLMN-provided cell selection criterion, e.g., a higher level of received radio signal strength or field strength—that possibly a smaller number of radio cells are considered to be suitable radio cells (compared to the specific situation of the user equipment applying (only) the conventionally known cell selection criterion). However, regarding such a possibly reduced number of "new" suitable cells, i.e. suitable radio cells according to the present invention, fulfilling the proposed HPLMN-provided cell selection criterion, it is likely that the user equipment is not only able to just register to these radio cells but also to actually transmit (payload) data according to the intended application the user equipment is used for. Hence, according to the present invention, in a first step, the user equipment determines suitable radio cells (of a considered radio access technology) based on the HPLMN-provided (or new) cell selection criterion (likewise regarding the considered (respective) radio access technology), which results in—in a second step, during the network selection stage (especially according to the automatic network selection mode)—only such suitable radio cells being considered (for network selection purposes of the user equipment) that have or correspond to reception conditions corresponding to or exceeding the HPLMN-provided (i.e. new) cell selection criterion.

According to the present invention, it is advantageously possible and preferred that the HPLMN-provided cell selection criterion comprises or takes into account a home-operator-controlled value being set or being able to be adjusted by the HPLMN or its operator, wherein the HPLMN-provided cell selection criterion is especially more restrictive compared to a cell selection criterion lacking a home-operator-controlled component.

According to the present invention, it is furthermore advantageously possible and preferred that the HPLMN-provided cell selection criterion comprises or takes into account a home-operator-controlled value being set or being able to be adjusted by the HPLMN or its operator, wherein the HPLMN-provided cell selection criterion is also applied during the normal cell-selection procedure once the network selection has taken place.

According to the present invention, it is furthermore advantageously possible and preferred that the HPLMN-provided cell selection criterion comprises or takes into account a home-operator-controlled value being set or being able to be adjusted by the HPLMN or its operator, wherein the HPLMN-provided cell selection criterion triggers the network selection in case the corresponding reception conditions, as measured by the user equipment do not correspond to or do not exceed the HPLMN-provided cell selection criterion.

It is thereby advantageously possible that the home public land mobile network is able to influence the behavior of the user equipment, even though the user equipment is using a visited mobile communication network. For example, it is advantageously possible to user-equipment-individually (or groupwise) adjust the value of the HPLMN-provided cell selection criterion in order to steer the cell selection of those user equipments in such a manner that the required or intended communication services is able to be provided by whichever (home or visited or further) mobile communication network in a stable and reliable manner.

According to the present invention, it is advantageously furthermore possible and preferred that the home-operator-controlled value of the HPLMN-provided cell selection criterion corresponds to:
an offset value being additionally applied compared to the cell selection criterion, or
an absolute value.

It is thereby advantageously possible according to the present invention to flexible adjust and modify the home-operator-controlled value of the HPLMN-provided cell selection criterion. Generally, the use of an offset value is probably preferred over the use of an absolute value; however, there might be (individual) cases or reception conditions such that the use of an absolute value might be preferable.

According to the present invention, it is furthermore advantageously possible and preferred that the home-operator-controlled value of the HPLMN-provided cell selection criterion
is stored in the user equipment, especially within or as part of the subscriber identity module or of another secure element or part of the user equipment, and/or
provided or transmitted to the user equipment, especially by the HPLMN or its operator, especially via using an over-the-air transmission method.

Via providing different possibilities and ways to modify and/or to store and/or transmit the home-operator-controlled value of the HPLMN-provided cell selection criterion, it is advantageously possible according to the present invention to flexibly manage even an important number of user equipment, or a group of user equipments being used for different specific tasks, such as, e.g., internet-of-things devices or machine type communication devices.

Furthermore, it is advantageously possible and preferred according to the present invention that the determination, by the user equipment and in or during the first step, of suitable radio cells of a considered radio access technology being based on the HPLMN-provided cell selection criterion is conducted
after switching on the user equipment, or
after recovery from lack of coverage, or
at a network reselection triggered by the user, or
periodically, in case the user equipment is in a visited communication network.

Furthermore, it is advantageously possible and preferred according to the present invention that in a third step, especially after the second step, an analogous determination of or regarding suitable radio cells is performed by the user equipment for purposes of cell re-selection, wherein also this determination, by the user equipment, of suitable radio cells of a considered radio access technology is based on the at least one HPLMN-provided cell selection criterion.

Thereby, it is advantageously possible to apply the HPLMN-provided (or new) cell selection criterion in different situations, and not only after switching on of the user equipment and after recovery from lack of coverage.

According to a further preferred embodiment of the present invention,
regarding GSM, global system for mobile communications, as radio access technology, the home-operator-controlled value of the HPLMN-provided cell selection criterion corresponds either to an offset value, home-operator-controlled_cell_selection_offset, to be added to the parameter RXLEV_ACCESS_MIN, or instead the parameter RXLEV_ACCESS_MIN is replaced by an absolute value of a parameter home-operator-controlled_RXLEV_ACCESS_MIN,
regarding UTRAN, UMTS Terrestrial Radio Access Network, E-UTRA, evolved UMTS Terrestrial Radio Access, NB-IoT, narrow-band internet-of-things, or NR, new radio in 5G systems, as radio access technology, the home-operator-controlled value of the HPLMN-provided cell selection criterion corresponds either to an offset value, home-operator-controlled-_cell_selection_offset, to be subtracted from the terms defining the parameter Srxlev, or instead the terms defining the parameter Srxlev are replaced by an absolute value of a parameter home-operator-controlled_RXLEV_ACCESS_MIN.

Furthermore, the present invention relates to a user equipment for realizing cell selection within a radio environment comprising a plurality of radio cells of a plurality of mobile communication networks, each one of these radio cells being associated, respectively, to at least one mobile communication network of the plurality of mobile communication networks,
wherein the user equipment is configured to measure or to detect reception conditions regarding the plurality of radio cells, and is configured to subsequently select and/or register to a mobile communication network out of the plurality of mobile communication networks, wherein the user equipment has or is associated with a home public land mobile network, HPLMN,
wherein regarding cell selection by the user equipment HPLMN-provided cell selection criterion is defined, wherein a radio cell of a considered radio access technology is considered to be a suitable radio cell only in case that the corresponding reception conditions, as measured by the user equipment, correspond to or exceed the HPLMN-provided cell selection criterion regarding the considered radio access technology,
wherein the user equipment is configured such that:
 suitable radio cells of a considered radio access technology are determined by the user equipment based on the HPLMN-provided cell selection criterion regarding the considered radio access technology,
 upon initiating network selection according to the automatic network selection mode, only such suitable radio cells are considered for network selection of the user equipment that have or correspond to reception conditions corresponding to or exceeding the HPLMN-provided cell selection criterion.

Furthermore, the present invention relates to a system or mobile communication network for realizing cell selection by a user equipment being in a radio environment comprising a plurality of radio cells of a plurality of mobile communication networks, each one of these radio cells being associated, respectively, to at least one mobile communication network of the plurality of mobile communication networks,
wherein the user equipment is configured to measure or to detect reception conditions regarding the plurality of radio cells, and is configured to subsequently select and/or register to a mobile communication network out of the plurality of mobile communication networks,
wherein the user equipment has or is associated with a home public land mobile network, HPLMN,
wherein regarding cell selection by the user equipment HPLMN-provided cell selection criterion is defined, wherein a radio cell of a considered radio access technology is considered to be a suitable radio cell only in case that the corresponding reception conditions, as measured by the user equipment, correspond to or exceed the HPLMN-provided cell selection criterion regarding the considered radio access technology,
wherein the system or the mobile communication network is configured such that:
 suitable radio cells of a considered radio access technology are determined by the user equipment based on the HPLMN-provided cell selection criterion regarding the considered radio access technology,
 upon initiating network selection according to the automatic network selection mode, only such suitable radio cells are considered for network selection of the user equipment that have or correspond to reception conditions corresponding to or exceeding the HPLMN-provided cell selection criterion,
wherein especially the mobile communication network corresponds to the home public land mobile network, HPLMN, of the user equipment and wherein especially the mobile communication network transmits an indication relating to the HPLMN-provided cell selection criterion or its home-operator-controlled value to the user equipment.

Additionally, the present invention relates to a program comprising a computer readable program code which, when executed on a computer and/or on a user equipment and/or on a network node of a mobile communication network, or in part on a user equipment and/or in part on network node of a mobile communication network, causes the computer and/or the user equipment and/or the network node of the mobile communication network to perform a method according to the invention.

Still additionally, the present invention relates to a computer-readable medium comprising instructions which when executed on a computer and/or on a user equipment and/or on a network node of a mobile communication network, or in part on a user equipment and/or in part on network node of a mobile communication network, causes the computer and/or the user equipment and/or the network node of the mobile communication network to perform a method according to the invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
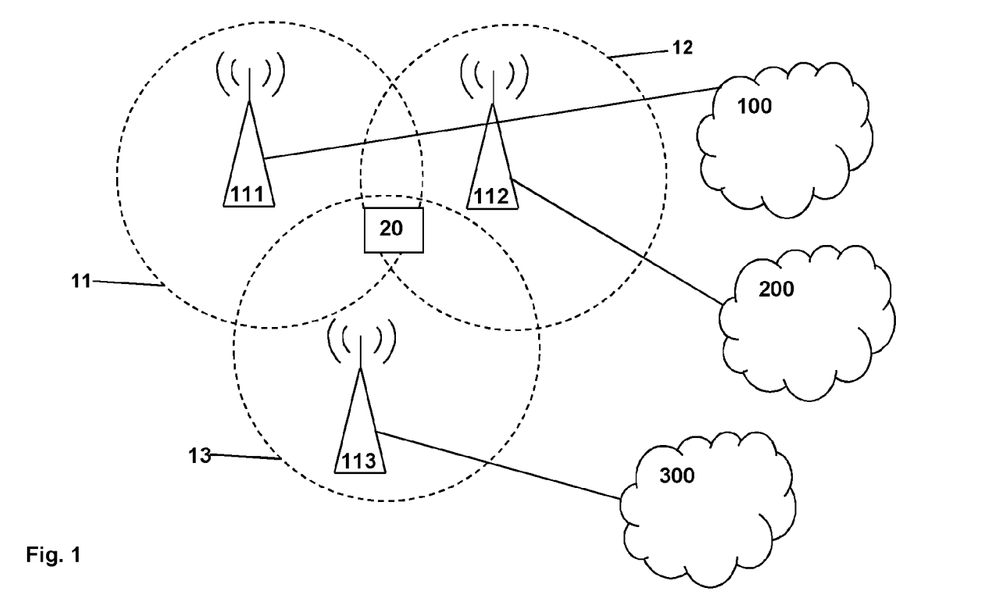
FIG. 1 schematically illustrates a user equipment in a radio environment comprising a plurality of radio cells of a plurality of mobile communication networks.

In FIG. 1, a user equipment 20 is schematically shown in a radio environment comprising a plurality of radio cells of a plurality of mobile communication networks. In the exemplary representation of FIG. 1, a first radio cell 11 is associated with or related to a first mobile communication network 100, a second radio cell 12 is associated with or related to a second mobile communication network 200, and a third radio cell 13 is associated with or related to a third mobile communication network 300.

Schematically, a base station entity is represented regarding each one of the three radio cells 11, 12, 13 that the user equipment 20 detects or "sees": A first base station entity 111 (typically but not necessarily of the first mobile communication network 100) generates or provides radio coverage of or regarding the first radio cell 11, a second base station entity 112 (typically but not necessarily of the second mobile communication network 200) generates or provides radio coverage of or regarding the second radio cell 12, and a third base station entity 113 (typically but not necessarily of the third mobile communication network 200) generates or provides radio coverage of or regarding the third radio cell 13.

In FIG. 1, the user equipment 20 is shown being located within the radio coverage area (illustrated via dashed circles) of the first radio cell 11, the second radio cell 12, as well as the third radio cell 13. The user equipment 20 measures or detects reception conditions regarding the plurality of radio cells 11, 12, 13, and subsequently selects and/or registers to a mobile communication network out of the plurality of mobile communication networks 100, 200, 300.

Figure 2:
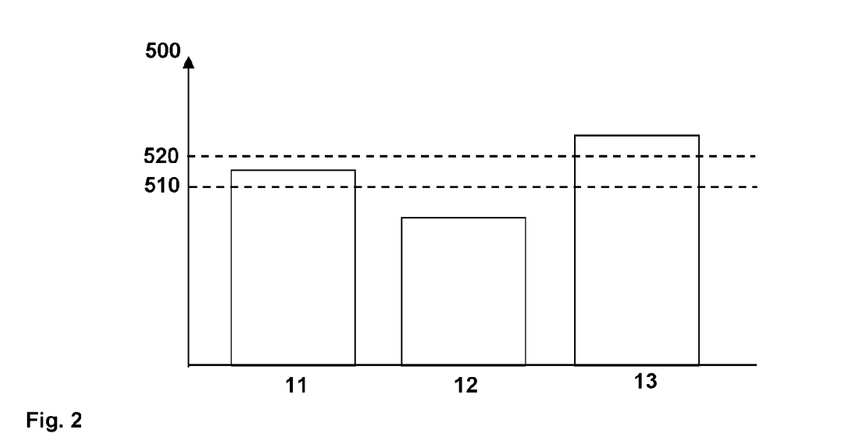
FIG. 2 schematically illustrates a situation of the user equipment measuring different signal strength of the different radio cells.

According to the present invention, a HPLMN-provided cell selection criterion is defined that the user equipment 20 uses regarding cell selection. The HPLMN-provided cell selection criterion is schematically shown in FIG. 2 which represents a situation of the user equipment 20 measuring different signal strength of the different radio cells 11, 12, 13. The ordinate of the diagram shown corresponds to the signal strength 500 or an indicator thereof (such as a field strength value or signal quality parameter). According to mechanisms in conventionally known mobile communication networks, the user equipment 20 would apply a conventionally defined cell selection criterion 510. According to this conventionally defined cell selection criterion 510, both the first radio cell 11 and the third radio cell 13 would be regarded as suitable radio cells (according to or applying the conventionally defined cell selection criterion 510) as both radio cells 11, 13 are schematically shown as having or providing (at the location of the user equipment 20) a signal strength corresponding to or exceeding the conventionally defined cell selection criterion 510. According to the present invention, the HPLMN-provided cell selection criterion 520 is defined and taken into consideration when it comes to select a radio cell. As the HPLMN-provided cell selection criterion 520 is typically more demanding or requires an increased reception signal level or quality (schematically indicated, in FIG. 2, via the HPLMN-provided cell selection criterion 520 being represented above the conventionally defined cell selection criterion 510, i.e. the HPLMN-provided cell selection criterion 520 is especially more restrictive compared to the conventionally defined cell selection criterion 510), only the third radio cell 13 is considered, by the user equipment 20 and due to measurements conducted by the user equipment 20, to be a suitable radio cell according to the present invention. Hence, in the exemplary situation shown in FIG. 2, only the third radio cell 13 is considered to be a suitable radio cell (as it is the only one (of the three radio cells represented) that the corresponding reception conditions, as measured by the user equipment 20, correspond to or exceed the HPLMN-provided cell selection criterion 520 regarding the considered radio access technology. Both in FIG. 1 and in FIG. 2, only radio cells and mobile communication networks are shown without differentiating between different radio access technologies. However, it is to be understood that this also applies for different radio access technologies, e.g. the third radio cell 13 might exceed the HPLMN-provided cell selection criterion 520 only regarding one specific radio access technology, but a radio cell of another radio access technology and also provided or generated by the third base station entity 113 might not exceed the respective HPLMN-provided cell selection criterion 520 to be applied regarding the other radio access technology, and, perhaps, vice versa for the other radio cells 11, 12.

According to the present invention, this cell selection (i.e. the determination of suitable radio cells, by the user equipment 20 and based on the HPLMN-provided cell selection criterion 520 regarding the considered radio access technology) is done in a first step, and in a second step, upon initiating network selection according to the automatic network selection mode, only such suitable radio cells are considered for network selection of the user equipment 20 that have or correspond to reception conditions corresponding to or exceeding the HPLMN-provided cell selection criterion 520. Via thereby restricting the candidate radio cells, a higher signal quality or performance of the user equipment 20 is able to be realized.

Additionally, especially according to the preferred embodiment according to which the HPLMN-provided cell selection criterion 520 comprises or takes into account a home-operator-controlled value being set or being able to be adjusted by the HPLMN or its operator, it is advantageously possible according to the present invention, that the home operator is able to influence the cell selection process, and thereby also the network selection process of the user equipment 20, and further or additional cell re-selection processes of the user equipment 20.

According to the present invention, it is advantageously possible that another cell selection criterion, i.e. the HPLMN-provided cell selection criterion 520, (different from the conventionally defined cell selection criterion 510) is able to be applied by the user equipment 20. According to the present invention, it is not necessarily required that all user equipments (e.g. of a group of user equipments having, for example, internet-of-things functionality or the like) are necessarily applying—via applying (a definition of a cell selection criterion based on) the HPLMN-provided cell selection criterion 520—a value as cell selection criterion different from the conventionally defined cell selection criterion 510: Via defining the HPLMN-provided cell selection criterion 520 differently from the conventionally defined cell selection criterion 510—and especially via the HPLMN-provided cell selection criterion 520 comprising or taking into account a home-operator-controlled value being set or being able to be adjusted by the HPLMN or its operator—it is advantageously possible for the home operator (or the operator of the HPLMN, i.e. the operator to which the user equipment 20 "belongs") to influence the behavior of the user equipment 20, especially the behavior of a part of a group of user equipments in a flexible manner. In an example, this further detailed in the following: If, for example, a group of, say, 1000 user equipments is deployed regarding a specific task such as providing a measurement value or the like, and in case that, e.g., 900 of these 1000 user equipments are able to be used and functioning without any problems based on implementing the present invention, i.e. using, as a cell selection criterion, the HPLMN-provided cell selection criterion 520 (instead of the conventionally defined cell selection criterion 510), wherein, however and despite the different definition of the HPLMN-provided cell selection criterion 520 (with respect to the conventionally defined cell selection criterion 510), the actual (field strength) value to compare with might correspond to the same value (e.g. in dB, i.e. if the HPLMN-provided cell selection criterion 520 is defined as comprising an additional summand compared to the conventionally defined cell selection criterion 510, wherein, however, the additional summand amounts to zero (e.g. dB)), then there is no need to apply any modification regarding those 900 functioning user equipments (especially there is no need to artificially apply a different cell selection value compared to the conventionally defined cell selection criterion 510). However, regarding to the residual 100 user equipments (which are not necessarily completely functional), the present invention provides the possibility—via the proposed modified definition of the cell selection criterion, i.e. the HPLMN-provided cell selection criterion 520—for the home public land mobile network to apply a more restrictive cell selection criterion (compared to the conventionally defined cell selection criterion 510), leading to a reduced rate of failures of such user equipments when communicating with the respective mobile communication network they are connected to.

According to the present invention, since only (mobile communication) networks having passed the cell selection criterion (to apply) are passed on to NAS (part of the user equipment 20) for network selection, there is preferably no modification regarding the network selection process, and all specified procedures regarding network selection can remain unchanged while achieving the desired behavior.

According to the present invention, a new, HPLMN-provided cell selection criterion is introduced and applied on the access network layer, (either in the form of absolute values or in the form of offset values, per radio access technology) is possibly stored on the subscriber identity module of the user equipment 20, and is especially to be set by the HPLMN (or its provider) or provided via signaling from the HPLMN.

The variant of providing an offset (i.e. an additional summand to add to the definition of the conventionally defined cell selection criterion 510 is preferred as an absolute value on top of the conventionally known procedure, carries the disadvantage of the visited public land mobile network not any more being able to apply the VPLMN cell specific offsets as introduced with UTRAN. Hence the actual network selection process remains unchanged, as only PLMNs with a higher field strength than the one set by the new, HPLMN-provided, cell selection criterion are reported to the NAS. This requires to change the AS logic (i.e. the definition of the cell selection criterion to apply, i.e. to use the HPLMN-provided cell selection criterion 520 instead of the conventionally defined cell selection criterion 510) as described below.

In the following, changes to the cell selection criteria (i.e. with regard to the conventionally defined cell selection criterion 510) according to the present invention are provided (regarding both the cases where the home-operator-controlled value of the HPLMN-provided cell selection criterion 520 corresponds to an offset value being additionally applied compared to the cell selection criterion 510, or being an absolute value) with respect to each radio access technology of the currently most often deployed radio access technologies:

For GSM, the parameter RXLEV_ACCESS_MIN, which is broadcast as system information, and is related to the minimum signal that the operator wants the network to receive when being initially accessed by a user equipment or mobile station, plus a home-operator-controlled value (home-operator-controlled_CellSelection-Offset), if available, where the home-operator-controlled value is an offset value either provided via signaling from the HPLM or retrieved from a respective field on the SIM maintained by the HPLMN, or where alternatively the RXLEV_ACCESS_MIN is replaced by a new (HPLMN-provided) absolute value, e.g. named home-operator-controlled_RXLEV_ACCESS_MIN provided via signaling from the HPLMN or retrieved from a respective field on the SIM maintained by the HPLMN.

UTRAN Network: For a UTRA Network the criteria among others to access or camp on a cell are given then by the new (HPLMN-provided) cell selection criterion S: The cell selection criterion S is fulfilled when, for FDD cells, Srxlev>0 and Squal>0, and, for TDD cells, Srxlev>0, where $$Squal = Q_{qualmeas} - (Qqualmin + QqualminOffset) - Qoffset_{temp}, \text{ and}$$

$$Srxlev = Q_{rxlevmeas} - (Qrxlevmin + QrxlevminOffset) - Pcompensation - Qoffset_{temp}, -\text{home-operator-controlled value}$$

(the home-operator-controlled value being named, e.g., home-operator-controlled_CellSelectionOffset)

where the signalled values QqualminOffset and QrxlevminOffset are only applied when a cell is evaluated for cell selection as a result of a periodic search for a higher priority PLMN while camped normally in a VPLMN (visited public land mobile network), and where: Squal corresponds to the Cell Selection quality value (dB), applicable only for FDD cells; Srxlev corresponds to the Cell Selection RX level value (dB);

Qoffsettemp corresponds to the Offset temporarily applied to a cell (dB);

Qqualmeas corresponds to the Measured cell quality value; the quality of the received signal expressed in CPICH $E_c/N_0$ (dB) for FDD cells. CPICH $E_c/N_0$ shall be averaged; applicable only for FDD cells;

Qrxlevmeas corresponds to the Measured cell RX level value; this is received signal, CPICH RSCP for FDD cells (dBm) and P-CCPCH RSCP for TDD cells (dBm);

Qqualmin corresponds to the Minimum required quality level in the cell (dB); applicable only for FDD cells;

QqualminOffset corresponds to the Offset to the signalled Qqualmin taken into account in the Squal evaluation as a result of a periodic search for a higher priority PLMN while camped normally in a VPLMN;

Qrxlevmin corresponds to the Minimum required RX level in the cell (dBm);

QrxlevminOffset corresponds to the Offset to the signalled Qrxlevmin taken into account in the Srxlev evaluation as a result of a periodic search for a higher priority PLMN while camped normally in a VPLMN;

Pcompensation corresponds to max(UE_TXPWR_MAX_RACH–P_MAX, 0) (dB) UE_TXPWR_MAX_RACH corresponds to the Maximum TX power level an UE may use when accessing the cell on RACH (read in system information) (dBm);

P_MAX corresponds to the Maximum RF output power of the UE (dBm);

home-operator-controlled_CellSelectionOffset corresponds to the offset in dB to be considered for user equipments (especially internet-of-things devices) if provided via signalingfrom the HPLMN or retrieved from a respective field on the SIM maintained by the HPLMN;

home-operator-controlled_RXLEV_ACCESS_MIN corresponds to an alternative in case a new (HPLMN-provided) absolute value shall be used: home-operator-controlled_RXLEV_ACCESS_MIN is being provided via signaling from the HPLM or retrieved from a respective field on the SIM maintained by the HPLMN; home-operator-controlled_RXLEV_ACCESS_MIN shall be considered instead of the term Qrxlevmeas–(Qrxlevmin+QrxlevminOffset)–Pcompensation–Qoffsettemp–home-operator-controlled_CellSelectionOffset LTE and NB-IoT Networks:

New (HPLMN-provided) Cell Selection Criterion for LTE: The cell selection criterion S in normal coverage is fulfilled when: Srxlev>0 AND Squal>0 where:

$$Srxlev = Qrxlevmeas - (Qrxlevmin + QrxlevminOffset) - Pcompensation - Qoffsettemp - \text{home-operator-controlled\_CellSelectionOffset, and}$$

$$Squal = Q_{qualmeas} - (Qqualmin + QqualminOffset) - Qoffset_{temp}$$

where:

Srxlev corresponds to the Cell selection RX level value (dB);

Squal corresponds to the Cell selection quality value (dB);

Qoffsettemp corresponds to the Offset temporarily applied to a cell (dB);

Qrxlevmeas corresponds to the Measured cell RX level value (RSRP);

Qqualmeas corresponds to the Measured cell quality value (RSRQ);

Qrxlevmin corresponds to the Minimum required RX level in the cell (dBm);

Qqualmin corresponds to the Minimum required quality level in the cell (dB);

Qrxlevminoffset corresponds to the Offset to the signalled Qrxlevmin taken into account in the Srxlev evaluation as a result of a periodic search for a higher priority PLMN while camped normally in a VPLMN;

Qqualminoffset corresponds to the Offset to the signalled Qqualmin taken into account in the Squal evaluation as a result of a periodic search for a higher priority PLMN while camped normally in a VPLMN;

Pcompensation corresponds to: If the UE supports the additionalPmax in the NS-PmaxList, if present, in SIB1, SIB3 and SIB5:

$$\max(PE\ MAX\ 1-PPowerClass,0)-(\min(PE\ MAX\ 2,PPowerClass)-\min(PE\ MAX\ 1,PPowerClass))\ (dB),\ \text{else:}$$

if PPowerClass is 14 dBm:$\max(PE\ MAX\ 1-(PPowerClass-Poffset),0)$ (dB), else: $\max(PE\ MAX\ 1-PPowerClass,0)$ (dB);

PEMAX1, PEMAX2 corresponds to the Maximum TX power level a UE may use when transmitting on the uplink in the cell (dBm) defined as PEMAX; PEMAX1 and PEMAX2 are obtained from the p-Max and the NS-PmaxList respectively in SIB1, SIB3 and SIB5 as specified in TS 36.331;

PPowerClass corresponds to the Maximum RF output power of the UE (dBm) according to the UE power class as defined in TS 36.101;

home-operator-controlled CellSelectionOffset corresponds to the offset in dB to be considered for user equipments (especially internet-of-things devices) once provided via signaling from the HPLMN or retrieved from a respective field on the SIM maintained by the HPLMN;

home-operator-controlled_RXLEV_ACCESS_MIN corresponds to an alternative in case a new (HPLMN-provided) absolute value shall be used: home-operator-controlled_RXLEV_ACCESS_MIN is being provided by via signaling from the HPLM or retrieved from a respective field on the SIM maintained by the HPLMN; home-operator-controlled_RXLEV_ACCESS_MIN shall be considered instead of the term Qrxlevmeas−(Qrxlevmin+QrxlevminOffset)−Pcompensation−Qoffset$_{temp}$−home-operator-controlled CellSelectionOffset New (HPLMN-provided) Cell Selection Criterion for NB-IoT: If the measurements are performed on the non-anchor carrier and UE meets the Cell Selection requirements the cell selection criterion S is fulfilled when: Srxlev>0, else, the cell selection criterion S is fulfilled when: Srxlev>0 AND Squal>0, where:

Srxlev=Qrxlevmeas−Qrxlevmin−Pcompensation−Qoffsettemp−home-operator-controlled_CellSelectionOffset, and Squal=Qqualmeas−Qqualmin−Qoffsettemp where:

Srxlev corresponds to the Cell selection RX level value (dB);

Squal corresponds to the Cell selection quality value (dB);

Qoffsettemp corresponds to the Offset temporarily applied to a cell as specified in TS 36.331 (dB);

Qrxlevmeas corresponds to the Measured cell RX level value (RSRP), if RSRP is measured on non-anchor carrier of the cell, the measured RSRP value is translated to Qrxlevmeas as:

Qrxlevmeas=QrxlevmeasNonAnchor−$nrs$-PowerOffsetNonAnchor, where

QrxlevmeasNonAnchor is the Measured RX level (RSRP) of the non-anchor carrier;

Qqualmeas corresponds to the Measured cell quality value (RSRQ);

Qrxlevmin corresponds to the Minimum required RX level in the cell (dBm), if UE is not authorized for enhanced coverage and Qoffsetauthorization is valid then Qrxlevmin=Qrxlevmin+Qoffsetauthorization;

Qqualmin corresponds to the Minimum required quality level in the cell (dB);

Pcompensation corresponds to: If the UE supports the additionalPmax in the NS-PmaxList-NB, if present, in SIB1-NB, SIB3-NB and SIB5-NB:

$$\max(PE\ MAX\ 1-PPowerClass,0)-(\min(PE\ MAX\ 2,PPowerClass)-\min(PE\ MAX\ 1,PPowerClass))\ (dB),\ \text{else: if PPowerClass is 14 dBm:}$$

$\max(PE\ MAX\ 1-(PPowerClass-Poffset),0)$ (dB), else:$\max(PE\ MAX\ 1-PPowerClass,0)$ (dB);

PEMAX1, PEMAX2 corresponds to the Maximum TX power level an UE may use when transmitting on the uplink in the cell (dBm) defined as PEMAX in TS 36.101. PEMAX1 and PEMAX2 are obtained from the p-Max and the NS-PmaxList-NB respectively in SIB1-NB, SIB3-NB and SIB5-NB as specified in TS 36.331;

PPowerClass corresponds to the Maximum RF output power of the UE (dBm) according to the UE power class as defined in TS 36.101;

home-operator-controlled_CellSelectionOffset corresponds to the offset in dB to be considered for user equipments (especially internet-of-things devices) once provided via signaling from the HPLMN or retrieved from a respective field on the SIM maintained by the HPLMN;

home-operator-controlled_RXLEV_ACCESS_MIN corresponds to an alternative in case a new (HPLMN-provided) absolute value shall be used: home-operator-controlled_RXLEV_ACCESS_MIN is being provided via signaling from the HPLM or retrieved from a respective field on the SIM maintained by the HPLMN; home-operator-controlled_RXLEV_ACCESS_MIN shall be considered instead of the term Qrxlevmeas−Qrxlevmin−Pcompensation−Qoffsettemp−home-operator-controlled_CellSelectionOffset.

NR Network: For a NR Network the criteria among others to access or camp on a cell is given below: The cell selection criterion S is fulfilled when: Srxlev>0 AND Squal>0 where:

Srxlev=Qrxlevmeas−(Qrxlevmin+Qrxlevminoffset)−Pcompensation−Qoffsettemp−home-operator-controlled_CellSelectionOffset, and Squal=Qqualmeas−(Qqualmin+Qqualminoffset)−
 Qoffsettemp, where:

Srxlev corresponds to the Cell selection RX level value (dB);
Squal corresponds to the Cell selection quality value (dB);
Qoffsettemp corresponds to the Offset temporarily applied to a cell as specified in TS 38.331 (dB);
Qrxlevmeas corresponds to the Measured cell RX level value (RSRP);
Qqualmeas corresponds to the Measured cell quality value (RSRQ);
Qrxlevmin corresponds to the Minimum required RX level in the cell (dBm); if the UE supports SUL frequency for this cell, Qrxlevmin is obtained from q-RxLevMinSUL, if present, in SIB1, SIB2 and SIB4, additionally, if QrxlevminoffsetcellSUL is present in SIB3 and SIB4 for the concerned cell, this cell specific offset is added to the corresponding Qrxlevmin to achieve the required minimum RX level in the concerned cell, else Qrxlevmin is obtained from q-RxLevMin in SIB1, SIB2 and SIB4, additionally, if Qrxlevminoffsetcell is present in SIB3 and SIB4 for the concerned cell, this cell specific offset is added to the corresponding Qrxlevmin to achieve the required minimum RX level in the concerned cell. Qqualmin corresponds to the Minimum required quality level in the cell (dB); additionally, if Qqualminoffsetcell is signalled for the concerned cell, this cell specific offset is added to achieve the required minimum quality level in the concerned cell;
Qrxlevminoffset corresponds to the Offset to the signalled Qrxlevmin taken into account in the Srxlev evaluation as a result of a periodic search for a higher priority PLMN while camped normally in a VPLMN, as specified in TS 23.122;
Qqualminoffset corresponds to the Offset to the signalled Qqualmin taken into account in the Squal evaluation as a result of a periodic search for a higher priority PLMN while camped normally in a VPLMN, as specified in TS 23.122;
Pcompensation corresponds to: For FR1, if the UE supports the additionalPmax in the NR-NS-PmaxList, if present, in SIB1, SIB2 and SIB4:

max(*PE* MAX 1−PPowerClass,0)−(min(*PE* MAX
 2,PPowerClass)−min(*PE* MAX 1,PPowerClass))
 (dB), else: max(*PE* MAX 1−PPowerClass,0)
 (dB); For *FR2*,Pcompensation is *set*to0;

PEMAX1, PEMAX2 corresponds to: Maximum TX power level of a UE may use when transmitting on the uplink in the cell (dBm) defined as PEMAX in TS 38.101; if UE supports SUL frequency for this cell, PEMAX1 and PEMAX2 are obtained from the p-Max for SUL in SIB1 and NR-NS-PmaxList for SUL respectively in SIB1, SIB2 and SIB4 as specified in TS 38.331, else PEMAX1 and PEMAX2 are obtained from the p-Max and NR-NS-PmaxList respectively in SIB1, SIB2 and SIB4 for normal UL as specified in TS 38.331;
PPowerClass corresponds to the Maximum RF output power of the UE (dBm) according to the UE power class as defined in TS 38.101-1;
The signalled values Qrxlevminoffset and Qqualminoffset are only applied when a cell is evaluated for cell selection as a result of a periodic search for a higher priority PLMN while camped normally in a VPLMN (TS 23.122);
home-operator-controlled_CellSelectionOffset corresponds to the offset in dB to be considered for user equipments (especially internet-of-things devices) once provided via signaling from the HPLMN or retrieved from a respective field on the SIM maintained by the HPLMN;
home-operator-controlled_RXLEV_ACCESS_MIN corresponds to an alternative in case a new (HPLMN-provided) absolute value shall be used: home-operator-controlled_RXLEV_ACCESS_MIN is being provided via signaling from the HPLM or retrieved from a respective field on the SIM maintained by the HPLMN; home-operator-controlled_RXLEV_ACCESS_MIN shall be considered instead of the term Qrxlevmeas−(Qrxlevmin+Qrxlevminoffset)−Pcompensation−Qoffsettemp−home-operator-controlled_CellSelectionOffset.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for realizing cell selection for a plurality of user equipments in a radio environment comprising a plurality of radio cells of a plurality of mobile communication networks, each one of the radio cells being associated, respectively, to at least one mobile communication network of the plurality of mobile communication networks,
 wherein the plurality of user equipments are configured to measure or detect reception conditions regarding the plurality of radio cells, and to subsequently select and/or register to a mobile communication network out of the plurality of mobile communication networks,
 wherein the plurality of user equipments are associated with a home public land mobile network (HPLMN),
 wherein the method comprises:
 defining, by the HPLMN, an HPLMN-provided cell selection criterion regarding a respective radio access technology, wherein the HPLMN-provided cell selection criterion comprises or takes into account a home-operator-controlled value set or able to be adjusted by the HPLMN, wherein the HPLMN-provided cell selection criterion is more restrictive relative to a cell selection criterion lacking a home-operator-controlled component, and wherein the home-operator-controlled value of the HPLMN-provided cell selection criterion corresponds to an offset value additionally applied relative to the cell selection criterion or an absolute value;

determining, by the HPLMN, whether using the HPLMN-provided cell selection criterion for respective groups of user equipments of the plurality of user equipments associated with the HPLMN would lead to reduced communication failure rates for the respective groups of user equipments;

providing, by the HPLMN, the HPLMN-provided cell selection criterion to a first group of user equipments of the plurality of user equipments associated with the HPLMN for which the HPLMN-provided cell selection criterion would lead to reduced communication failure rates;

determining, by a respective user equipment of the first group, suitable radio cells of the respective radio access technology out of a plurality of cells of a visited public land mobile network (VPLMN) based on the HPLMN-provided cell selection criterion, wherein the HPLMN-provided cell selection criterion is applied by the respective user equipment of the first group to each of the plurality of cells of the VPLMN, and wherein a respective radio cell of the respective radio access technology is determined to be a suitable radio cell based on reception conditions, as measured by the user equipment, corresponding to or exceeding the HPLMN-provided cell selection criterion regarding the respective radio access technology;

upon initiating network selection according to an automatic network selection mode, considering, by the respective user equipment of the first group, the determined suitable radio cells of the VPLMN that have or correspond to reception conditions corresponding to or exceeding the HPLMN-provided cell selection criterion for network selection;

registering, by the respective user equipment of the first group, to one of the determined suitable radio cells of the VPLMN that have or correspond to reception conditions corresponding to or exceeding the HPLMN-provided cell selection criterion; and transmitting, by the respective user equipment of the first group, payload data via the determined suitable radio cell of the VPLMN to which it is registered.

2. The method according to claim 1, wherein the HPLMN-provided cell selection criterion is also applied during a normal cell-selection procedure after the network selection has taken place; and/or
wherein the HPLMN-provided cell selection criterion triggers the network selection in case reception conditions, as measured by the respective user equipment of the first group, do not correspond to or do not exceed the HPLMN-provided cell selection criterion.

3. The method according to claim 1, wherein the home-operator-controlled value of the HPLMN-provided cell selection criterion is provided to the respective user equipment of the first group, by the HPLMN, via an over-the-air transmission.

4. The method according to claim 1, wherein the method further comprises:

determining, by the respective user equipment of the first group, suitable radio cells for cell re-selection based on the HPLMN-provided cell selection criterion.

5. The method according to claim 1, wherein the respective radio access technology is global system for mobile communications (GSM); and
wherein:
the home-operator-controlled value of the HPLMN-provided cell selection criterion corresponds to an offset value home-operator-controlled_cell_selection_offset, to be added to the parameter RXLEV_ACCESS_MIN, or
the parameter RXLEV_ACCESS_MIN is replaced by an absolute value of a parameter home-operator-controlled_RXLEV_ACCESS_MIN.

6. The method according to claim 1, wherein the respective radio access technology is UMTS Terrestrial Radio Access Network (UTRAN), evolved UMTS Terrestrial Radio Access (E-UTRA), narrow-band internet-of-things (NB-IoT), or new radio (NR) in 5G systems; and
wherein:
the home-operator-controlled value of the HPLMN-provided cell selection criterion corresponds to an offset value, home-operator-controlled_cell_selection_offset, to be subtracted from the terms defining the parameter Srxlev; or
the terms defining the parameter Srxlev are replaced by an absolute value of a parameter home-operator-controlled_RXLEV_ACCESS_MIN.

7. The method according to claim 1, wherein the home-operator-controlled value of the HPLMN-provided cell selection criterion corresponds to an offset value additionally applied relative to the cell selection criterion.

8. The method according to claim 1, wherein the home-operator-controlled value of the HPLMN-provided cell selection criterion corresponds to an absolute value.

9. A system, comprising:
a plurality of user equipments in a radio environment comprising a plurality of radio cells of a plurality of mobile communication networks, each one of the radio cells being associated, respectively, to at least one mobile communication network of the plurality of mobile communication networks; and
a home public land mobile network (HPLMN), wherein the HPLMN is associated with the plurality of user equipments;
wherein the plurality of user equipments are configured to measure or detect reception conditions regarding the plurality of radio cells, and to subsequently select and/or register to a mobile communication network out of the plurality of mobile communication networks,
wherein the HPLMN is configured to:
define an HPLMN-provided cell selection criterion regarding a respective radio access technology, wherein the HPLMN-provided cell selection criterion comprises or takes into account a home-operator-controlled value set or able to be adjusted by the HPLMN, wherein the HPLMN-provided cell selection criterion is more restrictive relative to a cell selection criterion lacking a home-operator-controlled component, and wherein the home-operator-controlled value of the HPLMN-provided cell selection criterion corresponds to an offset value additionally applied relative to the cell selection criterion or an absolute value;
determine whether using the HPLMN-provided cell selection criterion for respective groups of user equipments of the plurality of user equipments associated with the HPLMN would lead to reduced communication failure rates for the respective groups of user equipments; and provide the HPLMN-provided cell selection criterion to a first group of user equipments of the plurality of user equipments associated with the HPLMN for which the HPLMN-provided cell selection criterion would lead to reduced communication failure rates; and wherein a respective user equipment of the first group is configured to:

determine suitable radio cells of the respective radio access technology out of a plurality of cells of a visited public land mobile network (VPLMN) based on the HPLMN-provided cell selection criterion, wherein the HPLMN-provided cell selection criterion is applied by the respective user equipment of the first group to each of the plurality of cells of the VPLMN, and wherein a respective radio cell of the respective radio access technology is determined to be a suitable radio cell based on reception conditions, as measured by the user equipment, corresponding to or exceeding the HPLMN-provided cell selection criterion regarding the respective radio access technology;

upon initiating network selection according to an automatic network selection mode, consider the determined suitable radio cells of the VPLMN that have or correspond to reception conditions corresponding to or exceeding the HPLMN-provided cell selection criterion for network selection;

register to one of the determined suitable radio cells of the VPLMN that have or correspond to reception conditions corresponding to or exceeding the HPLMN-provided cell selection criterion; and transmit payload data via the determined suitable radio cell of the VPLMN to which it is registered.

10. The system according to claim 9, wherein the home-operator-controlled value of the HPLMN-provided cell selection criterion corresponds to an offset value additionally applied relative to the cell selection criterion.

11. The system according to claim 9, wherein the home-operator-controlled value of the HPLMN-provided cell selection criterion corresponds to an absolute value.

12. One or more non-transitory computer-readable mediums having processor-executable instructions stored thereon for realizing cell selection for a plurality of user equipments in a radio environment comprising a plurality of radio cells of a plurality of mobile communication networks, each one of the radio cells being associated, respectively, to at least one mobile communication network of the plurality of mobile communication networks, wherein the plurality of user equipments are configured to measure or detect reception conditions regarding the plurality of radio cells, and to subsequently select and/or register to a mobile communication network out of the plurality of mobile communication networks, wherein the plurality of user equipments are associated with a home public land mobile network (HPLMN), wherein the processor-executable instructions, when executed, facilitate performance of the following:

defining, by the HPLMN, an HPLMN-provided cell selection criterion regarding a respective radio access technology, wherein the HPLMN-provided cell selection criterion comprises or takes into account a home-operator-controlled value set or able to be adjusted by the HPLMN, wherein the HPLMN-provided cell selection criterion is more restrictive relative to a cell selection criterion lacking a home-operator-controlled component, and wherein the home-operator-controlled value of the HPLMN-provided cell selection criterion corresponds to an offset value additionally applied relative to the cell selection criterion or an absolute value;

determining, by the HPLMN, whether using the HPLMN-provided cell selection criterion for respective groups of user equipments of the plurality of user equipments associated with the HPLMN would lead to reduced communication failure rates for the respective groups of user equipments;

providing, by the HPLMN, the HPLMN-provided cell selection criterion to a first group of user equipments of the plurality of user equipments associated with the HPLMN for which the HPLMN-provided cell selection criterion would lead to reduced communication failure rates;

determining, by a respective user equipment of the first group, suitable radio cells of the respective radio access technology out of a plurality of cells of a visited public land mobile network (VPLMN) based on the HPLMN-provided cell selection criterion, wherein the HPLMN-provided cell selection criterion is applied by the respective user equipment of the first group to each of the plurality of cells of the VPLMN, and wherein a respective radio cell of the respective radio access technology is determined to be a suitable radio cell based on reception conditions, as measured by the user equipment, corresponding to or exceeding the HPLMN-provided cell selection criterion regarding the respective radio access technology;

upon initiating network selection according to an automatic network selection mode, considering, by the respective user equipment of the first group, the determined suitable radio cells of the VPLMN that have or correspond to reception conditions corresponding to or exceeding the HPLMN-provided cell selection criterion for network selection;

registering, by the respective user equipment of the first group, to one of the determined suitable radio cells of the VPLMN that have or correspond to reception conditions corresponding to or exceeding the HPLMN-provided cell selection criterion; and transmitting, by the respective user equipment of the first group, payload data via the determined suitable radio cell of the VPLMN to which it is registered.

13. The one or more non-transitory computer-readable mediums according to claim 12, wherein the home-operator-controlled value of the HPLMN-provided cell selection criterion corresponds to an offset value additionally applied relative to the cell selection criterion.

14. The one or more non-transitory computer-readable mediums according to claim 12, wherein the home-operator-controlled value of the HPLMN-provided cell selection criterion corresponds to an absolute value.

* * * * *